US011239510B2

(12) United States Patent
Choi et al.

(10) Patent No.: US 11,239,510 B2
(45) Date of Patent: Feb. 1, 2022

(54) SYSTEM AND METHOD OF MANAGING BATTERY OF VEHICLE

(71) Applicants: HYUNDAI MOTOR COMPANY, Seoul (KR); KIA MOTORS CORPORATION, Seoul (KR)

(72) Inventors: Sung Hoon Choi, Suwon-si (KR); Yu Hyun Sung, Seoul (KR); Jeong Min Shin, Suwon-si (KR); Dong Jin Nam, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 280 days.

(21) Appl. No.: 16/583,694

(22) Filed: Sep. 26, 2019

(65) Prior Publication Data
US 2020/0303791 A1 Sep. 24, 2020

(30) Foreign Application Priority Data

Mar. 18, 2019 (KR) .................. 10-2019-0030577

(51) Int. Cl.
| *H01M 10/6552* | (2014.01) |
| *B60L 58/26* | (2019.01) |
| *H01M 10/613* | (2014.01) |
| *H01M 10/6566* | (2014.01) |
| *H01M 10/635* | (2014.01) |
| *H01M 10/6568* | (2014.01) |
| *H01M 10/625* | (2014.01) |

(52) U.S. Cl.
CPC ......... *H01M 10/6552* (2015.04); *B60L 58/26* (2019.02); *H01M 10/613* (2015.04); *H01M 10/625* (2015.04); *H01M 10/635* (2015.04); *H01M 10/6566* (2015.04); *H01M 10/6568* (2015.04)

(58) Field of Classification Search
None
See application file for complete search history.

(56) References Cited

U.S. PATENT DOCUMENTS

2017/0158081 A1* 6/2017 Kim .................... H01M 10/613

FOREIGN PATENT DOCUMENTS

KR 10-2012-0055414 A 5/2012

* cited by examiner

*Primary Examiner* — Eugenia Wang
(74) *Attorney, Agent, or Firm* — Morgan, Lewis & Bockius LLP

(57) ABSTRACT

A system for managing a battery of a vehicle may include: a temperature sensor measuring temperature of external air; an electric device cooler including an electric device mounted in the vehicle, an electric device cooling pipe through which cooling water for cooling the electric device flows, and a first pump circulating the cooling water; a battery cooler including a battery and a battery cooling pipe through which the cooling water for cooling the battery flows; one or more 3-way valves connecting or disconnecting the electric device cooling pipe to or from the battery cooling pipe; and a controller configured to control the first pump and the one or more 3-way valves to move the cooling water in the battery cooling pipe to the electric device cooling pipe when the measured temperature of the external air is the predetermined temperature or less.

10 Claims, 6 Drawing Sheets

200(210,220,230,240,250)   300(310,320,330,340,350)

200(210,220,230,240,250)  300(310,320,330,340,350)

200(210,220,230,240,250)    300(310,320,330,340,350)

200(210,220,230,240,250)   300(310,320,330,340,350)

200(210,220,230,240,250)    300(310,320,330,340,350)

SYSTEM AND METHOD OF MANAGING BATTERY OF VEHICLE

CROSS-REFERENCE TO RELATED APPLICATION

This application claims the benefit of priority to Korean Patent Application No. 10-2019-0030577, filed on Mar. 18, 2019 in the Korean Intellectual Property Office, the entire disclosure of which is incorporated herein by reference.

TECHNICAL FIELD

The present disclosure relates to a system and method of managing a battery of a vehicle and, more particularly, to a system and method of managing a battery of a vehicle, the system and method being able to increase time that a battery takes to reach a low temperature by blocking and suppressing heat transfer from the battery to external air by replacing cooling fluid in a battery cooling pipe with gas by moving cooling water in the battery cooling pipe to a reservoir tank of an electric device cooler when measured temperature of the external air is predetermined temperature or less.

BACKGROUND

The performance and lifespan of eco-friendly vehicle are directly influenced by security of durability of a high-voltage battery. In detail, there are many factors that influence the durability of a high-voltage battery such as an SOC use range and the intensity of current, but the largest influence factor among them is temperature. In particular, resistance in a battery increases at low temperature, so the available range of voltage decreases and output performance of a high-voltage battery is deteriorated, whereby deterioration of a battery is accelerated. This low-temperature phenomenon of a battery occurs due to heat transfer to external air at low temperature when a predetermined time passes after a vehicle is parked in the wintertime. For this reason, currently, high-voltage battery systems are designed to increase the temperature of a battery using a battery heater (PTC) when the temperature of the battery is lower than a reference temperature.

Meanwhile, when a high-voltage battery is deteriorated, resistance of voltage to current increases. This increase of resistance accelerates performance reduction and deterioration of a battery particularly when the battery is exposed to low temperature. In order to prevent this problem, a heater is separately installed and increases the temperature of a battery into a predetermined use temperature range through a temperature-increasing process when the battery is at a low temperature in water cooling-type high-voltage batteries in the related art.

However, according to this method of the related art, when a battery is left at a low temperature for a long period of time and the temperature of the battery decreases, it takes a long time to increase the temperature of the battery using a heater, so energy consumption of the battery increases. Therefore, there is a problem in that the output of a battery may be limited and the durability of the battery decreases due to an increase in energy consumption of the battery by an increase in temperature-increasing time.

SUMMARY

The present disclosure has been made in an effort to solve the problems and an aspect of the present disclosure is to provide a system and method of managing a battery of a vehicle, the system and method being able to increase the time that a battery takes to reach a low temperature by blocking and suppressing heat transfer from the battery to external air by replacing cooling fluid in a battery cooling pipe with gas by moving cooling water in the battery cooling pipe to a reservoir tank of an electric device cooler when measured temperature of the external air is predetermined temperature or less.

According to one aspect of the present disclosure, a system for managing a battery of a vehicle may include: a temperature sensor measuring temperature of external air; an electric device cooler including an electric device mounted in the vehicle, an electric device cooling pipe through which cooling water for cooling the electric device flows, and a first pump circulating the cooling water; a battery cooler including a battery and a battery cooling pipe through which the cooling water for cooling the battery flows; one or more 3-way valves connecting or disconnecting the electric device cooling pipe to or from the battery cooling pipe; and a controller configured to control the first pump and the one or more 3-way valves to move the cooling water in the battery cooling pipe to the electric device cooling pipe when the measured temperature of the external air is a predetermined temperature or less, so as to make an inside of the battery cooling pipe into a gaseous state.

The one or more 3-way valves may include a first 3-way valve installed in the electric device cooler and a second 3-way valve installed in the battery cooler.

The controller may control the one or more 3-way valves to connect the battery cooling pipe and the electric device cooling pipe to each other when the measured temperature of the external air is the predetermined temperature or less, and may control the one or more 3-way valves to disconnect the battery cooling pipe and the electric device cooling pipe from each other when the measured temperature of the external air exceeds the predetermined temperature.

The system may further include a flow sensor, disposed at a front end of at least one of the one or more 3-way valves, measuring a flow rate of the cooling water from the battery cooling pipe to the electric device cooling pipe when the battery cooling pipe and the electric device cooling pipe are connected through the at least one of the one or more 3-way valves.

The controller may stop operation of the first pump, and may control the one or more 3-way valves to disconnect the battery cooling pipe and the electric device cooling pipe from each other, when the flow rate measured by the flow sensor is a predetermined value or less.

The electric device cooler may further include one or more of: a heat exchanger cooling the cooling water flowing through the electric device cooling pipe; and a reservoir tank being injected with the cooling water and storing the cooling water.

The battery cooler may further include at least one of: a second pump circulating the cooling water in the battery cooling pipe; a chiller cooing the cooling water in the battery cooling pipe; a heater increasing temperature of the cooing water in the battery cooling pipe; or an air pump and an air valve for moving the cooling water in the battery cooling pipe to the electric device cooling pipe.

The controller may drive at least one of the second pump or the air pump to move the cooling water in the battery cooling pipe to the electric device cooling pipe when driving the first pump.

The controller may open the air valve when operating the first pump, and may close the air valve when moving of the cooling water in the battery cooling pipe to the electric device cooling pipe is finished.

The controller may control the battery cooler to increase temperature of the battery when the temperature of the battery is a predetermined temperature or less, and to cool the battery when the temperature of the battery exceeds the predetermined temperature.

According to another aspect of the present disclosure, a method of managing a battery of a vehicle may include: measuring temperature of external air; controlling a first pump and a 3-way valve to move cooling water in a battery cooling pipe to an electric device cooling pipe when the measured temperature of the external air is a predetermined temperature or less; measuring a flow rate of the cooling water moving from the battery cooling pipe to the electric device cooling pipe; and stopping operation of the first pump, and controlling the 3-way valve to disconnect the battery cooling pipe and the electric device cooling pipe from each other, when the measured flow rate is a predetermined value or less.

According to one aspect of the present disclosure, when measured external air temperature is a predetermined temperature or less, the cooing fluid in the battery cooling pipe is replaced by gas by moving the cooling water in the battery cooling pipe to the reservoir tank of the electric device cooler, whereby it is possible to increase time that the battery takes to reach low temperature by blocking and suppressing heat transfer from the battery to the external air.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

A system and method for managing a battery of a vehicle according to exemplary embodiments of the present disclosure will be described herein with reference to the accompanying drawings.

Figure 1:
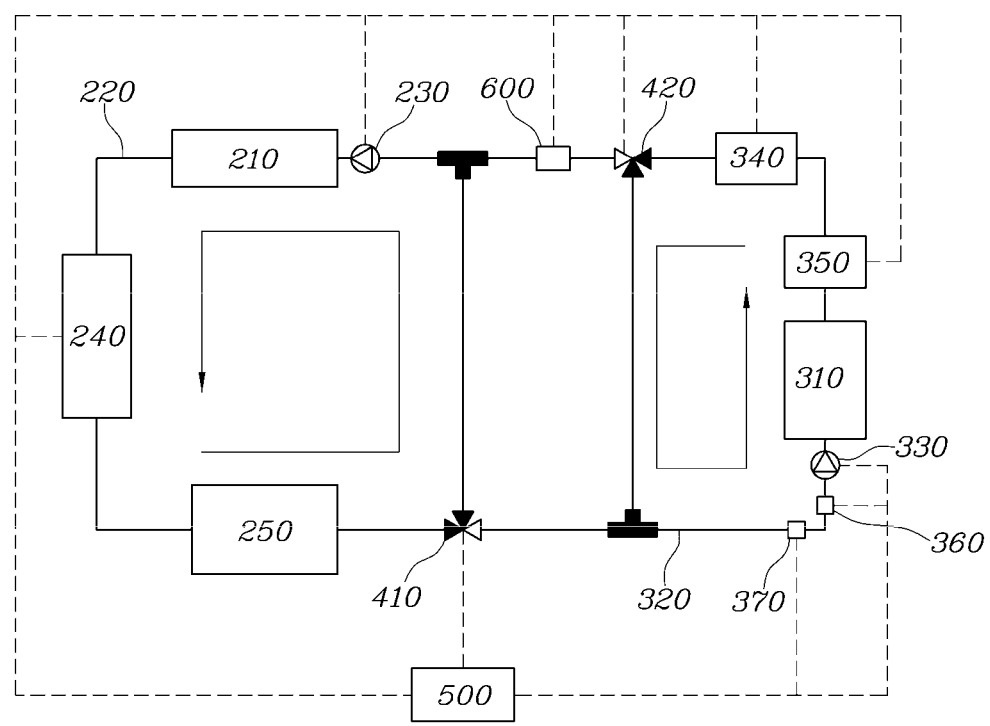
FIG. 1 is a diagram showing the configuration of a system for managing a battery of a vehicle according to an exemplary embodiment of the present disclosure.
Figure 2:
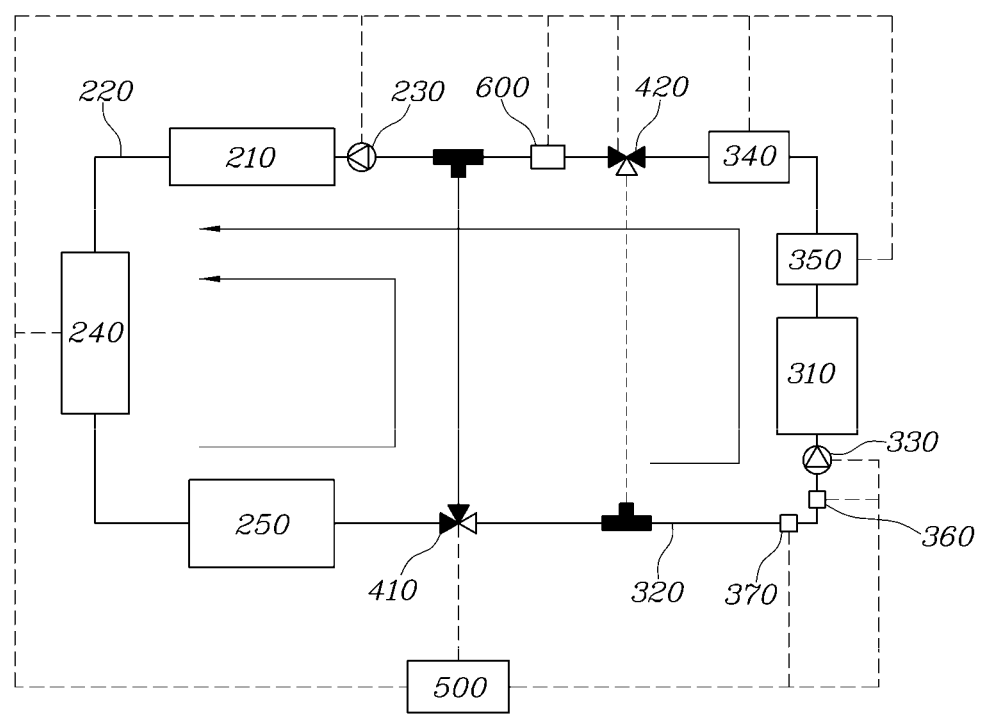
FIG. 2 is a view showing the operation of a system for managing a battery of a vehicle according to an exemplary embodiment of the present disclosure when external air temperature is a predetermined temperature or less.
Figure 3:
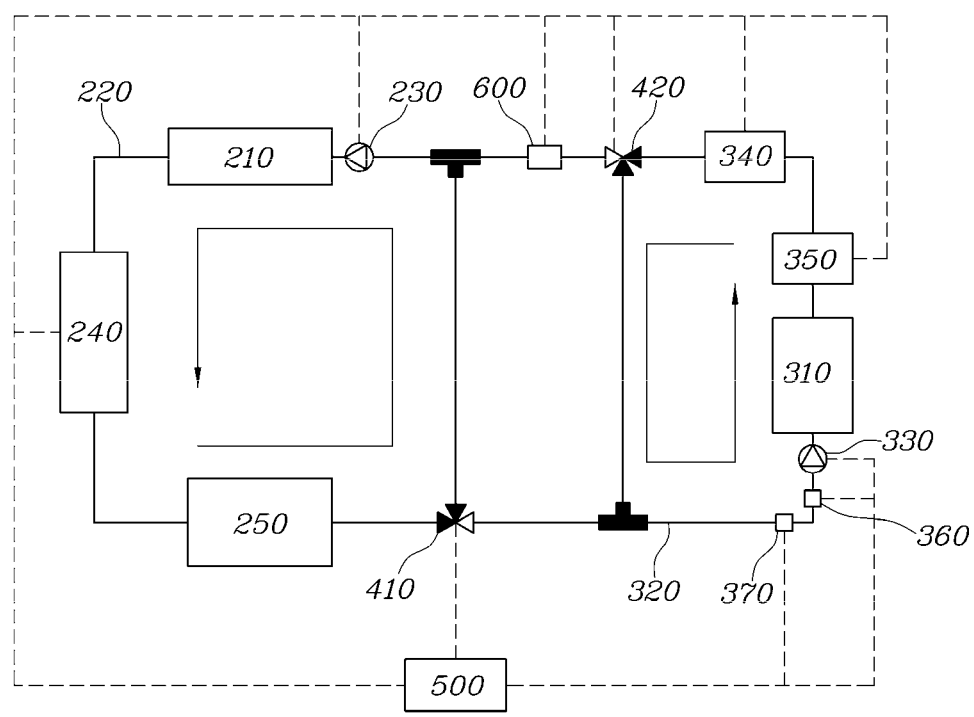
FIG. 3 is a view showing the operation of system for managing a battery of a vehicle according to an exemplary embodiment of the present disclosure when external air temperature exceeds a predetermined temperature.
Figure 4:
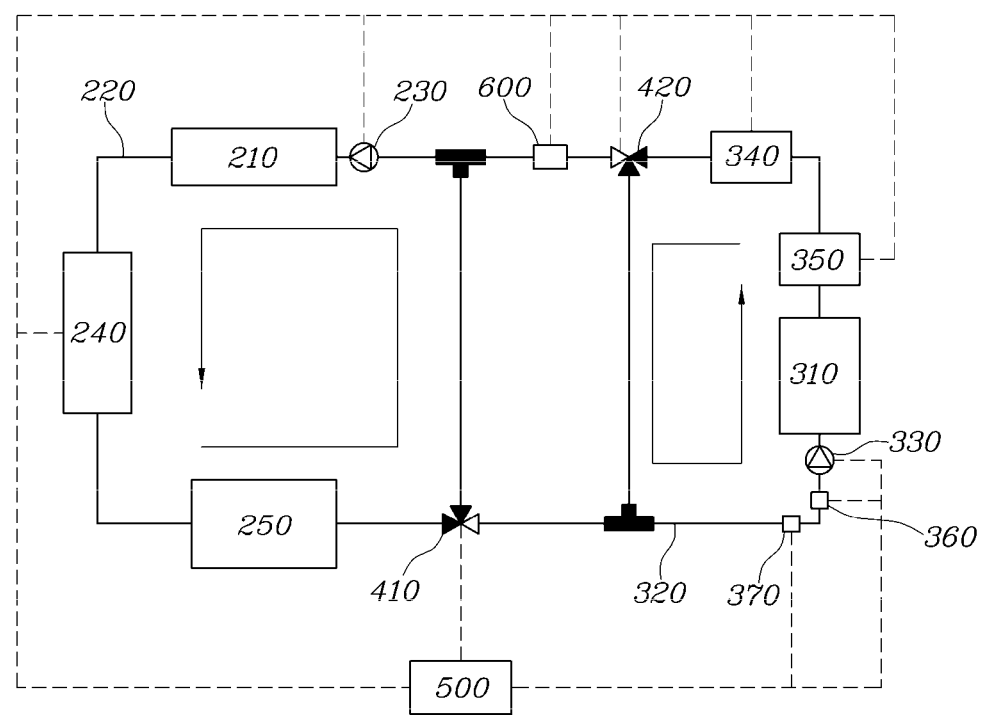
FIG. 4 is a view showing the state when cooling water finishes moving in a battery cooling pipe in a system for managing a battery of a vehicle according to an exemplary embodiment of the present disclosure.
Figure 5:
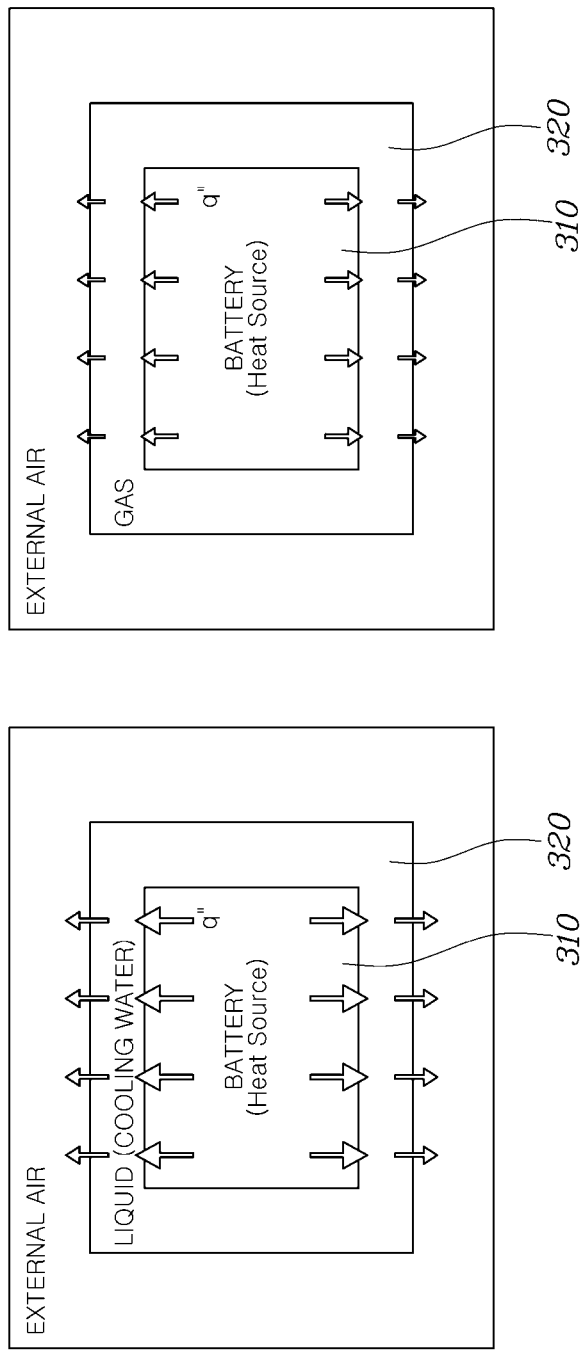
FIG. 5 is a view showing heat transfer of a battery cooling pipe according to fluid in a system for managing a battery of a vehicle according to an exemplary embodiment of the present disclosure.

FIG. 1 is a diagram showing the configuration of a system for managing a battery of a vehicle according to an exemplary embodiment of the present disclosure, FIG. 2 is a view showing the operation of a system for managing a battery of a vehicle when external air temperature is a predetermined temperature or less, FIG. 3 is a view showing the operation of a system for managing a battery of a vehicle when external air temperature exceeds a predetermined temperature, FIG. 4 is a view showing the state when cooling water finishes moving in a battery cooling pipe, and FIG. 5 is a view showing heat transfer of a battery cooling pipe according to fluid in a system for managing a battery of a vehicle according to an exemplary embodiment of the present disclosure. The system for managing a battery of a vehicle according to an exemplary embodiment of the present disclosure may be applied to a hybrid vehicle or an electric vehicle that use both an engine and a motor.

As shown in FIG. 1, a system for managing a battery of a vehicle according to an exemplary embodiment of the present disclosure may include a temperature sensor 100, an electric device cooler 200, a 3-way valve 400, and a controller 500. The detailed configuration of the system for managing a battery of a vehicle according to an exemplary embodiment of the present disclosure is described in detail hereafter.

The temperature sensor 100 measures the temperature of external air. The temperature information of external air measured by the temperature sensor 100 is transmitted to the controller 500 and the transmitted temperature information of the external air is compared with a predetermined temperature by the controller 500.

The electric device cooler 200 may include an electric device 210 mounted in a vehicle, an electric device cooling pipe 220 through which cooling water for cooling the electric device 210 flows, and a first pump 230 circulating the cooling water, and may further include one or more of a heat exchanger 240 cooling the cooling water flowing through the electric device cooling pipe 220 and a reservoir tank 250 being injected with cooling water and storing the cooling water.

In detail, the electric device 210 mounted in a vehicle, which is an electric device that generates heat when an eco-friendly vehicle is driven, may include a motor or an inverter that is required for driving an eco-friendly vehicle, according to exemplary embodiments of the present disclosure. Further, various electric vehicles that are required to be cooled because they generate heat when an eco-friendly vehicle is driven may be included in the electric device of the present disclosure. For example, the electric device 210 may include a Hybrid Starter Generator (HSG), a Hybrid Power Control Unit (HPCU), an Oil Pump Unit (OPU), etc.

The heat exchanger 240 may be disposed in the front of a vehicle and cools cooling water that flows through the electric device cooling pipe 220. According to exemplary embodiments of the present disclosure, the heat exchanger 240 may be a radiator. In detail, the heat exchanger 240 can cool the cooling water that flows through the electric device cooling pipe 220 through heat exchange with external air that flows inside when a vehicle is driven.

The first pump 230 circulates cooling water in the electric device cooler 200. Further, the first pump 230 is controlled by the controller 500, which will be described below, to move cooling water in a battery cooling pipe 320 to the electric device cooling pipe 220 when external air temperature is a predetermined temperature or less. The first pump 230 may be an Electric Water Pump (EWP) in the present disclosure. In more detail, the first pump 230 circulates cooling water, which has been cooled through the heat exchanger 240, through the electric device cooling pipe 220, thereby being able to cool the electric device 210 including a motor and an inverter such that they are no overheated.

The reservoir tank 250 is injected with cooling water and stores the cooling water, and the injected cooling water can be supplied to a battery cooler 300 through the 3-way valve 400. When external temperature is a predetermined temperature or less, the reservoir tank 250 can store cooling water moved to the electric device cooling pipe 220 from the battery cooling pipe 320 by the first pump 230.

The electric device cooling pipe 220 connects the electric device 210, the first pump 230, and the heat exchanger 240, and the cooling water in the electric device cooling pipe 220 flows through the first pump 230, thereby being able to circulate.

The battery cooler 300 cools a battery 310 mounted in a vehicle. In detail, the battery cooler 300 may include the battery 310 and the battery cooling pipe 320, and may further include at least one or ore of a second pump 330, a chiller 340, a heater 350, an air pump 360, and an air valve 370.

The battery 310 provides energy for driving an eco-friendly vehicle. The battery 310 in the present disclosure may be a high-voltage battery that can provide energy required for driving an eco-friendly vehicle by driving a motor mounted in the vehicle.

The battery cooling pipe 320 connects the battery 310, the second pump 330, the chiller 340, the heater 350, the air pump 360, and the air valve 370, and the cooling water in the battery cooling pipe 320 flows through the second pump 330, thereby being able to circulate.

The second pump 330 can supply the cooling water injected in the reservoir tank 250 to the battery cooling pipe 320 of the battery cooler 300. Further, the second pump 330 is controlled by the controller 500 to be described below, thereby being able to move the cooling water in the battery cooling pipe 320 to the electric device cooling pipe 220 by assisting the first pump 330 when external air temperature measured by the temperature sensor 100 is a predetermined temperature or less.

The chiller 340 is disposed at the front end of the battery 310 and cools the cooling water in the battery cooling pipe 320. Though not shown in detail in the drawings, the chiller 340 can be maintained at low temperature by a refrigerant circulating a refrigerant pipe of an air-conditioner, can cool cooling water circulating through the battery cooling pipe 320 by exchanging heat with the cooling water, and can cool the battery 310 using the cooled cooling water.

The heater 350 increases the temperature of the battery 310, that is, is controlled by the controller 500, thereby being able to increase the temperature of the battery 310 when the temperature of the battery 310 is a predetermined temperature or less. According to exemplary embodiments of the present disclosure, the heater 350 may be a Positive Temperature Coefficient Heater (PTC).

The air pump 360 and the air valve 370 are installed at the front end of the battery 310, and are controlled by the controller 500, thereby being able to help the cooling water in the battery cooling pipe 320 move to the electric device cooling pipe 220 by operating and assisting the first pump 230 when external air temperature is a predetermined temperature or less.

The 3-way valve 400 is controlled by the controller 500, thereby being able to connect or disconnect the electric device cooling pipe 220 and the battery cooling pipe 320, and one or more 3-way valves may be installed. In detail, the 3-way valve 400 may include a first 3-way valve 410 installed in the electric device cooler 200 and a second 3-way valve 420 installed in the battery cooler 300. Connecting or disconnecting the electric device cooling pipe 220 and the battery cooling pipe 320 using the 3-way valve 400 will be described below with reference to FIGS. 2 to 4 in the description about the controller 500.

A flow sensor 600, as shown in FIG. 2, is installed at the front end of the second 3-way valve 420 installed in the battery cooler 300 and measures the flow rate of the cooling water moving from the battery cooling pipe 320 to the electric device cooling pipe 220 when the battery cooling pipe 320 and the electric device cooling pipe 220 are connected through the second 3-way valve 420. The flow rate information of cooling water measured by the flow sensor 600 can be transmitted to the controller 500.

When the external air temperature measured by the temperature sensor 100 is a predetermined temperature or less, the controller 500 controls the first pump 230 and the 3-way valve 400, so as to move the cooling water in the battery cooling pipe 320 to the electric device cooling pipe 220, thereby being able to make an inside of the battery cooling pipe 320 into a gaseous state.

Referring to FIG. 2, when the external air temperature measured by the temperature sensor 100 is a predetermined temperature or less, the controller 500 can connect the battery cooling pipe 320 and the electric device cooling pipe 220 by controlling the 3-way valves 410 and 420. In detail, when the measured external air temperature is a predetermined temperature or less, the controller 500, as shown in FIG. 2, connects the battery cooling pipe 320 and the electric device cooling pipe 220 through the second 3-way valve 420 and moves the cooling water in the battery cooling pipe 320 to the electric device cooling pipe 220 such that the cooling water is stored in the reservoir tank 250. In this process, the controller 500 can disconnect the battery cooling pipe 320 and the electric device cooling pipe 220 by controlling the first way valve 410.

On the other hand, referring to FIG. 3, when the external air temperature measured by the temperature sensor 100 exceeds the predetermined temperature, the controller 500 can disconnect the battery cooling pipe 320 and the electric device cooling pipe 220 by controlling the 3-way valves 410 and 420. In detail, when measured external air temperature exceeds the predetermined temperature, the controller 500, as shown in FIG. 3, can disconnect the battery cooling pipe 320 from the electric device cooling pipe 220 by controlling the first 3-way valve 410 and the second 3-way valve 420.

Further, referring to FIG. 4, when a flow rate measured by the flow sensor 600 is a predetermined value or less, the controller 500 can stop the operation of the first pump 230 and disconnect the battery cooling pipe 320 and the electric device cooling pipe 220 by controlling the 3-way valves 410 and 420.

On the other hand, when driving the first pump 230, the controller 500 can move the cooling water in the battery cooling pipe 320 to the electric device cooling pipe 220 by driving one or more of the second pump 330 and the air pump 360. In detail, the controller 500 can open the air valve 370 when operating the first pump 230, and can close the air valve 370 when the cooling water in the battery cooling pipe 320 finishes moving to the electric device cooling pipe 220.

Further, the controller 500 can increase the temperature of the battery 310 by operating the heater 350 by controlling the battery cooler 300 when the temperature of the battery 310 is a predetermined temperature or less, and can cool the battery 310 by operating the chiller 340 when the temperature of the battery 310 exceeds the predetermined temperature.

FIG. 5 is a view showing heat transfer of a battery cooling pipe according to fluid in a system for managing a battery of a vehicle according to an exemplary embodiment of the present disclosure. Referring to FIG. 5, as shown at the left side, when the fluid in a battery cooling pipe is liquid, there is a defect that heat actively transfers from the battery 310 that is a heat source to the liquid, which is effective for cooling that changes a high-temperature state into a low-temperature state, but is weak to thermal insulation. However, as shown at the right side, when the fluid in a cooling pipe is gas, cooling performance is deteriorated, but the thermal insulation effect can be improved, as shown in the following table, because gas has a smaller convective heat transfer coefficient than liquid.

TABLE

| Item | h (Convective heat transfer coefficient, $W/m^2 \cdot K$) | |
| --- | --- | --- |
| | Gas | Liquid |
| Free convection | 2-25 | 50-1000 |
| Forcible convection | 25-250 | 100-20,000 |

In other words, according to an exemplary embodiment of the present disclosure, on the basis of the detailed configuration of the system for managing a battery of a vehicle described in detail above, when external air temperature measured by the temperature sensor is a predetermined temperature or less, the cooing fluid in the battery cooling pipe is replaced by gas by moving the cooling water in the battery cooling pipe to the reservoir tank of the electric device cooler, whereby it is possible to increase the time that the battery takes to reach low temperature by blocking and suppressing heat transfer from the battery to the external air. Accordingly, the durability of the battery can be improved.

Figure 6:
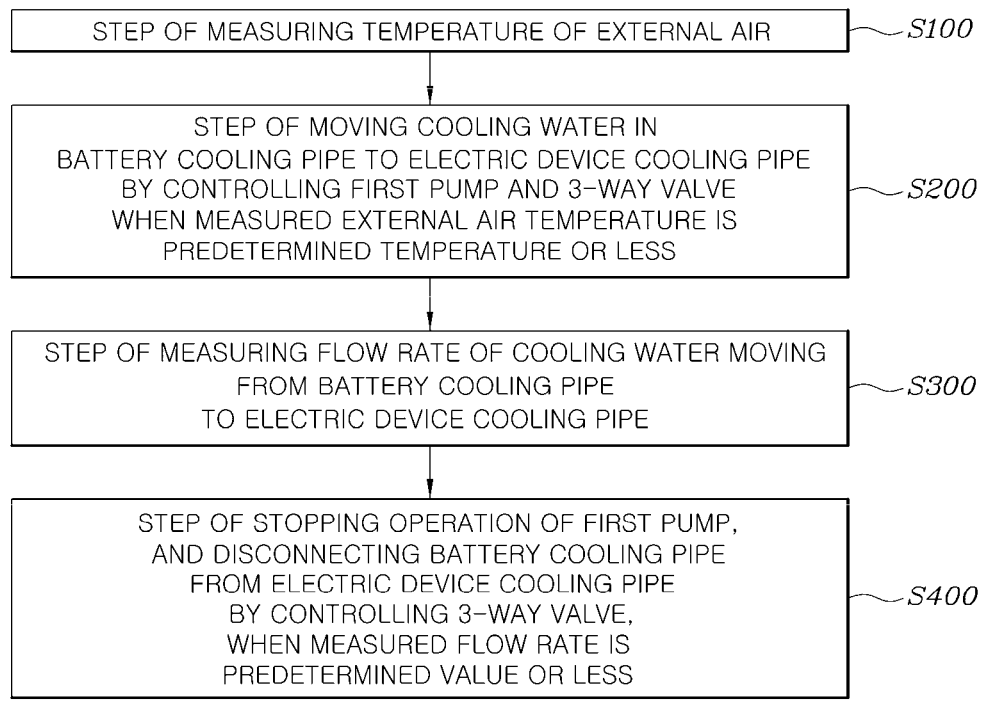
FIG. 6 is a view showing the flow of a method of managing a battery according to an exemplary embodiment of the present disclosure.

FIG. 6 is a view showing the flow of a method of managing a battery according to an exemplary embodiment of the present disclosure. As shown in FIG. 6, a method of managing a battery according to an exemplary embodiment of the present disclosure may include: measuring the temperature of external air; moving cooling water in a battery cooling pipe to an electric device cooling pipe by controlling a first pump and a 3-way valve when the measured external air temperature is a predetermined temperature or less; measuring the flow rate of the cooling water moving from the battery cooling pipe to the electric device cooling pipe; and stopping the operation of the first pump, and disconnecting the battery cooling pipe and the electric device cooling pipe by controlling the 3-way valve, when the measured flow rate is a predetermined value or less.

What is claimed is:

1. A system for managing a battery of a vehicle, the system comprising:
    a temperature sensor measuring temperature of external air;
    an electric device cooler including an electric device mounted in the vehicle, an electric device cooling pipe through which cooling water for cooling the electric device flows, and a first pump circulating the cooling water;
    a battery cooler including a battery cooling pipe through which the cooling water for cooling the battery flows;
    one or more 3-way valves connecting or disconnecting the electric device cooling pipe to or from the battery cooling pipe; and
    a controller configured to control the first pump and the one or more 3-way valves to move the cooling water in the battery cooling pipe to the electric device cooling pipe when the measured temperature of the external air is a predetermined temperature or less, so as to make an inside of the battery cooling pipe into a gaseous state.

2. The system of claim 1, wherein the one or more 3-way valves include a first 3-way valve installed in the electric device cooler and a second 3-way valve installed in the battery cooler.

3. The system of claim 1, wherein the controller controls the one or more 3-way valves to connect the battery cooling pipe and the electric device cooling pipe to each other when the measured temperature of the external air is the predetermined temperature or less, and controls the one or more 3-way valves to disconnect the battery cooling pipe and the electric device cooling pipe from each other when the measured temperature of the external air exceeds the predetermined temperature.

4. The system of claim 1, further comprising a flow sensor, installed at a front end of at least one of the one or more 3-way valves, measuring a flow rate of the cooling water from the battery cooling pipe to the electric device cooling pipe when the battery cooling pipe and the electric device cooling pipe are connected through the at least one of the one or more 3-way valves.

5. The system of claim 4, wherein the controller stops operation of the first pump, and controls the one or more 3-way valves to disconnect the battery cooling pipe and the electric device cooling pipe from each other, when the flow rate measured by the flow sensor is a predetermined value or less.

6. The system of claim 1, wherein the electric device cooler further includes one or more of: a heat exchanger cooling the cooling water flowing through the electric device cooling pipe; and
    a reservoir tank being injected with the cooling water and storing the cooling water.

7. The system of claim 1, wherein the battery cooler further includes at least one of:
    a second pump circulating the cooling water in the battery cooling pipe;
    a chiller cooing the cooling water in the battery cooling pipe;
    a heater increasing temperature of the cooing water in the battery cooling pipe; or
    an air pump and an air valve for moving the cooling water in the battery cooling pipe to the electric device cooling pipe.

8. The system of claim 7, wherein the controller drives at least one of the second pump or the air pump to move the cooling water in the battery cooling pipe to the electric device cooling pipe when driving the first pump.

9. The system of claim 7, wherein the controller opens the air valve when operating the first pump, and closes the air valve when moving of the cooling water in the battery cooling pipe to the electric device cooling pipe is finished.

10. The system of claim 1, wherein the controller controls the battery cooler to increase temperature of the battery when the temperature of the battery is a predetermined temperature or less, and to cool the battery when the temperature of the battery exceeds the predetermined temperature.

* * * * *